Sept. 7, 1965   E. F. MITCHELL, JR   3,204,952
MODEL AIRPLANE GUIDANCE DEVICE
Filed Jan. 25, 1963   3 Sheets-Sheet 1
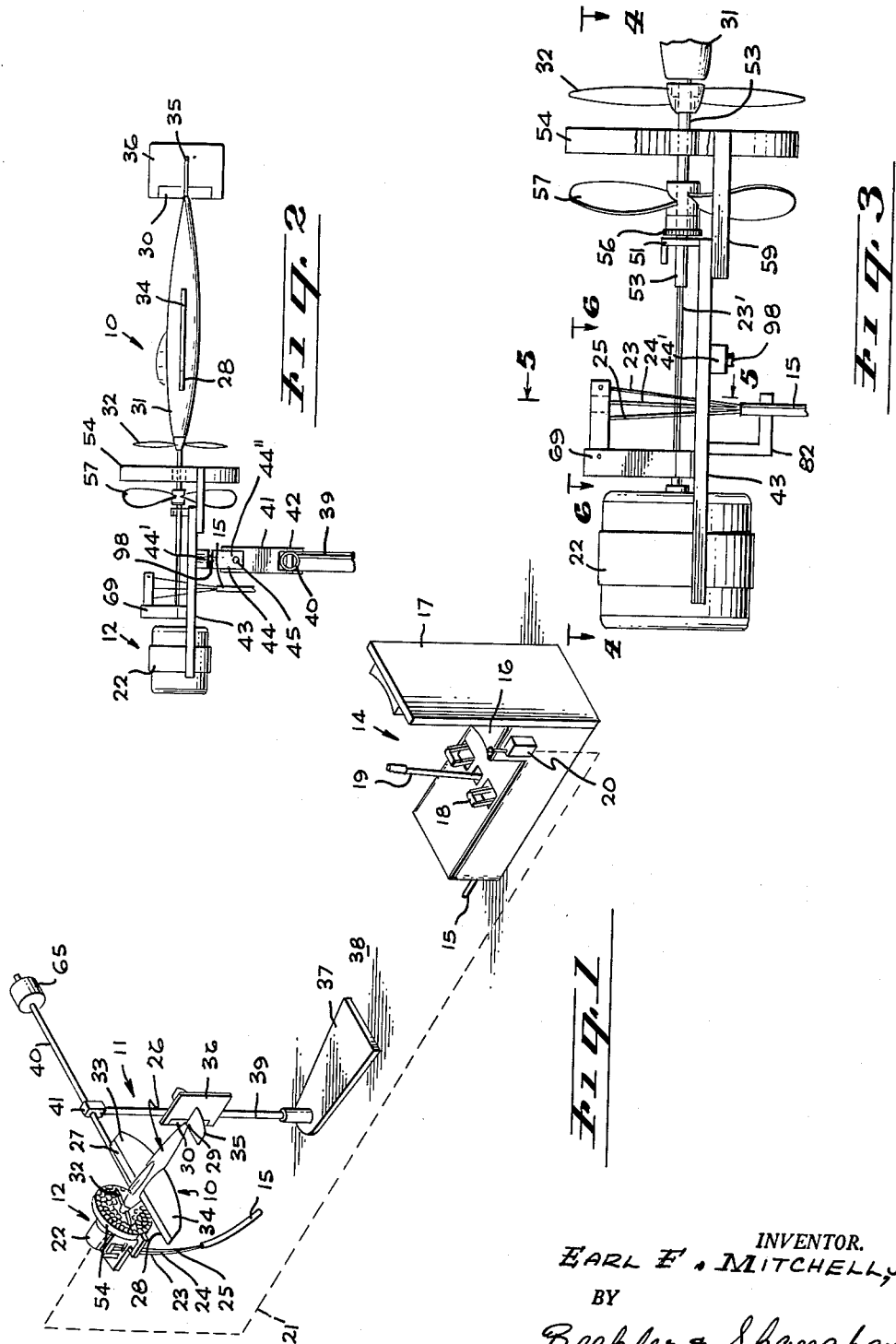
INVENTOR.
EARL F. MITCHELL, JR.
BY
Beehler & Shanahan
ATTORNEYS

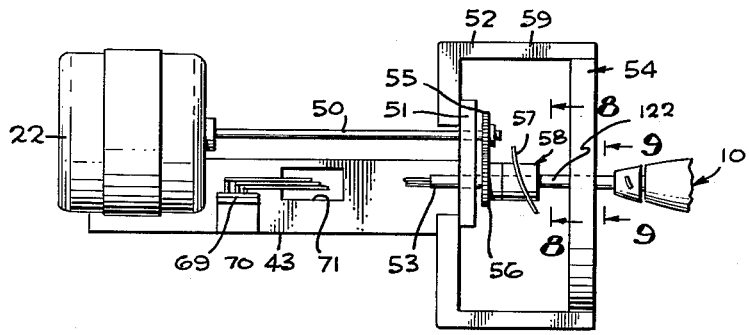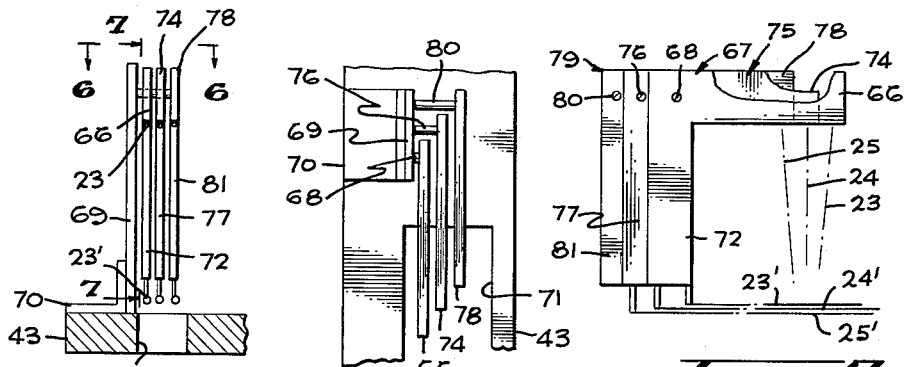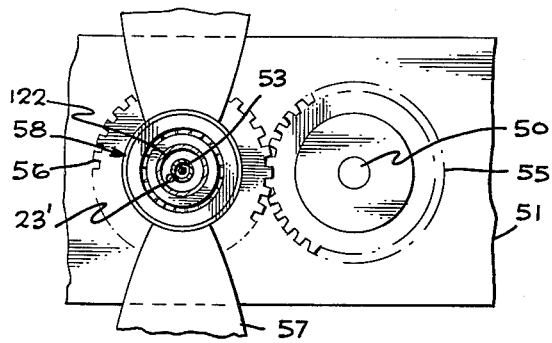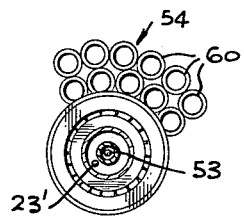

Sept. 7, 1965     E. F. MITCHELL, JR     3,204,952
MODEL AIRPLANE GUIDANCE DEVICE
Filed Jan. 25, 1963     3 Sheets-Sheet 3
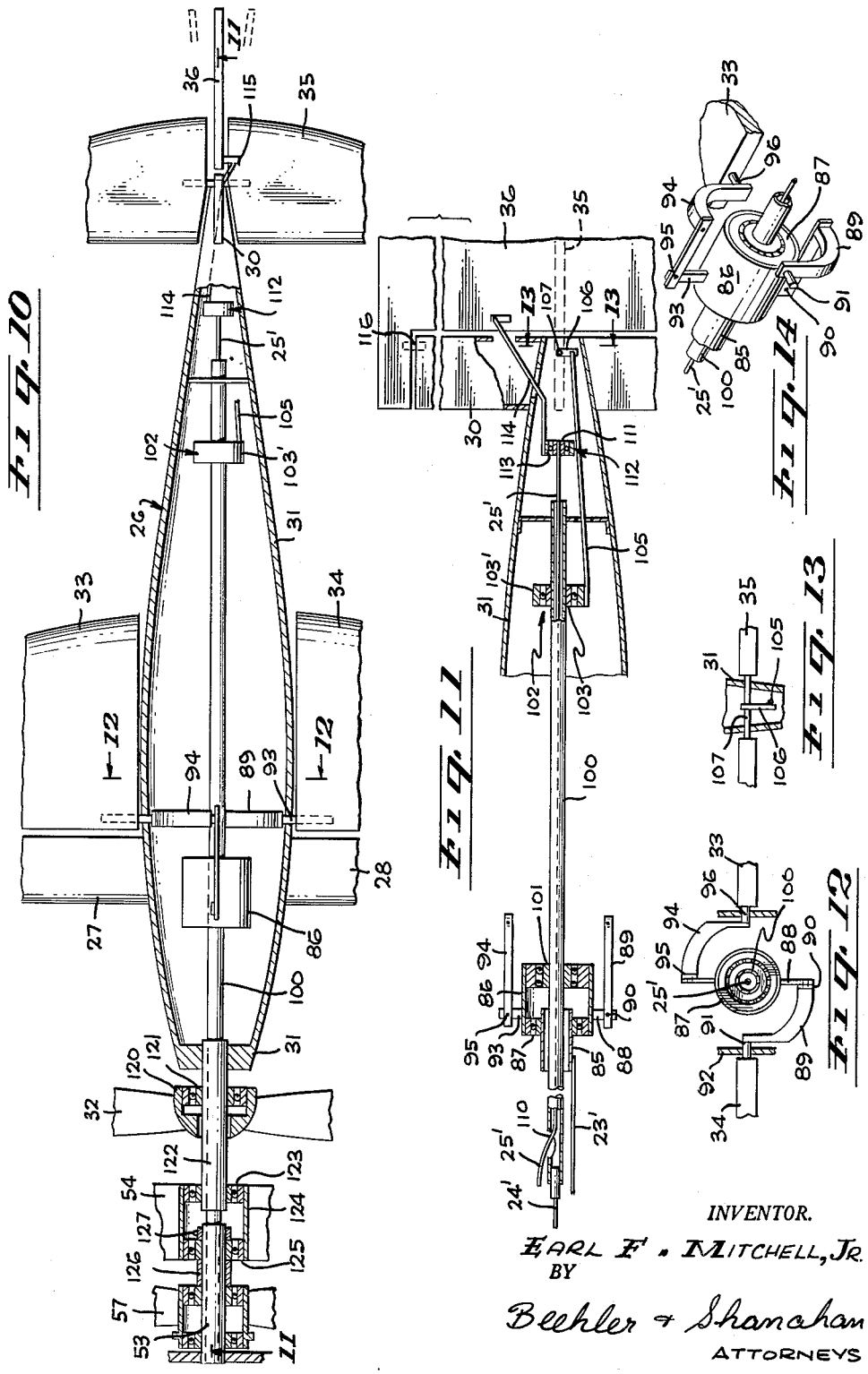
INVENTOR.
EARL F. MITCHELL, JR.
BY
Beehler + Shanahan
ATTORNEYS

United States Patent Office 3,204,952
Patented Sept. 7, 1965

3,204,952
MODEL AIRPLANE GUIDANCE DEVICE
Earl F. Mitchell, Jr., 2420 Hyperion Ave.,
Los Angeles, Calif.
Filed Jan. 25, 1963, Ser. No. 253,958
5 Claims. (Cl. 272—31)

The invention relates to toys and models, whether serving as toys or laboratory models, and has special reference to a guidance system for a model airplane of such nature that the operator, by manipulating conventional airplane controls, can cause a model airplane to maneuver in a very realistic fashion including not only diving and turning, but also rolling in response to relative motion with respect to a path of air without need for a wind tunnel. The invention relates particularly to the mounting of a model airplane in counterbalanced relationship upon a stand in the path of an air flow generated for example by an electric fan, the model airplane being provided with flexible controls connected in such fashion that they do not impair maneuverability of the model airplane as it is put through various combinations of activities in response to guidance by the operator.

Although wind tunnel studies of model airplanes are well known and even of very sophisticated nature from the point of view of causing the model airplane to assume all sorts and descriptions of attitudes in a stream of air, wind tunnel models have been somewhat objectionable because of their complexity and precision of manufacture. By this is meant although such models serve extremely well for laboratory study, they do not lend themselves to use as toys and by unsophisticated model makers who are more interested in visual performance of a model plane than in the niceties of aerodynamics. Further still, models of the kind above made reference to are primarily for permanent mountings in a wind tunnel where a blast of air is under complete control and contained within some appropriate housing or casing and can only be reached for adjustment by interrupting the wind tunnel operation and opening some hatch or door in order to gain access to the model airplane. On the other hand, flying models which are self-propelled, as for example by miniature gasoline engines, are tethered by long control wires and the manipulation of model airplanes flown in this fashion needs a large field, or in any event, a very large space in order to have the airplane fly freely, and such space is not always readily available. Those model airplanes which have been attempted for operation in a limited space have also been very limited in the combinations of motions possible and hence, where they have been presented as toys, they have tended to become rather boring and unsatisfactory by reason of their lack of versatility.

It is therefore among the objects of the invention to provide a new and improved model airplane guidance device which makes possible manipulating a model airplane in a small space, but which at the same time makes possible putting the model airplane through virtually all of the types of maneuvers which would be possible as in an actual airplane in flight.

Another object of the invention is to provide a new and improved model airplane and a guidance system for its control which permits the airplane all of the customary attitudes, but while the airplane is tethered to some appropriate support, the control being exercised by a set of controls on some stationary support to the rear, or in any event, adjacent to the mounting.

Still another object of the invention is to provide a new and improved model airplane and guidance device for its control which permits the operator or pilot to be seated realistically rearwardly of the airplane, and to make the airplane assume virtually all of the attitudes of the real airplane in flight, while the airplane remains located at all times immediately in front of him, thereby permitting the operator to observe in detail all of the attitudes of the airplane as they are made.

Still another object of the invention is to provide a new and improved model airplane and a guidance device for its controls and a mounting for the airplane which permits a limited amount of movement sufficient to assume all the customary attitudes of an airplane, but which at the same time makes it unnecessary for the airplane to fly away because of the fact that a stream of air flowing parallel to the air supported surfaces is carried with the airplane as it dives, turns, and rolls, the system further being made possible by providing flexible controls entering the airplane at a longtiudinal axis of roll in order that the whole operation can be carried out by a simple low-powered lightweight fan and requiring conventional lightweight construction in the airplane itself.

Still further among the objects of the invention, are to provide a model airplane and guidance device for its operation which is simple, positive, and relatively inexpensive in order to make a realistic educational toy available at a moderate price.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a side perspective view of the model airplane and guidance accessories in a typical position upon a supporting surface.

FIGURE 2 is a side elevational view of the model airplane and its mounting.

FIGURE 3 is a side elevational view of the forward part of FIGURE 2 on a larger scale.

FIGURE 4 is a plan view taken on the line 4—4 of FIGURE 3.

FIGURE 5 is a fragmentary cross-sectional view and taken on the line 5—5 of FIGURE 3.

FIGURE 6 is a fragmentary plan view taken on the line 6—6 of FIGURE 5.

FIGURE 7 is a vertical fragmentary sectional view taken on the line 7—7 of FIGURE 5.

FIGURE 8 is a cross-sectional view taken on the line 8—8 of FIGURE 4.

FIGURE 9 is a fragmentary cross-sectional view taken on the line 9—9 of FIGURE 4.

FIGURE 10 is a plan view of the model airplane partially broken away to show the controls within the fuselage.

FIGURE 11 is a fragmentary longitudinal sectional view taken on the line 11—11 of FIGURE 10.

FIGURE 12 is a fragmentary cross-sectional view taken on the line 12—12 of FIGURE 10.

FIGURE 13 is a fragmentary cross-sectional view taken on the line 13—13 of FIGURE 11.

FIGURE 14 is a fragmentary side perspective view of portions of the device shown in FIGURE 12.

In an embodiment of the invention chosen for the purpose of illustration, there is shown a model airplane indicated generally by the reference character 10 attached to a supporting stand 11 which likewise supports a source 12 of air. Rearwardly of the airplane and its stand is a pilot station 14, the controls of which are interconnected with the airplane through a composite control cable 15. The pilot station is substantially conventional in its structure, and consists of a seat 16 having a back-rest 17, located so that a pilot can manipulate rudder pedals 18; and a control stick 19, for the manipulation of the ailerons and the elevator. A switch-box 20, is provided with an appropriate control lever for the manipulation of the source of air. More properly in the last instance, an electric line 21, connects with a fan motor 22, in a substantially conventional fashion in order to start and stop the fan motor when the device is to be operated. The previously identified cable 15, carries individual cable leads 23, 24, and 25, which through a suitable mechanical train are connected respectively to the aileron, elevator and rudder control surfaces.

The model airplane itself, previously identified by the reference character 10 consists of a body or fuselage 26, wings 27 and 28, and a horizontal stabilizer 29, which with a vertical fin or stabilizer 30, comprise essentially the tail of the fuselage. At the forward end of the fuselage is a nose section 31, and in advance of the nose section is a freely rotating or idling propeller 32. On the wings 27 and 28 respectively, are ailerons 33 and 34. The horizontal stabilizer is provided with an elevator 35 and a rudder 36 is attached to the vertical fin 30. The aileron, elevator and rudder may be made substantially oversize in order to make the airplane responsive to light drafts of air, so that the entire device, including the power supply for the source of air can be kept small, lightweight and inexpensive while at the same time, providing true response of the airplane to the guidance system.

The stand, previously identified, which holds the airplane in its operative position, consists of a footing 37, adapted to rest upon some stationary support 38, and the pilot station may also be mounted on the same stationary support in the relative position shown in FIGURE 1. Extending upwardly from the footing is a column 39. A balance arm 40 is mounted upon the top of the column by employment of a bracket fixture 41, as shown in FIGURES 1 and 2. The bracket fixture is attached to the column by means of a pivot pin 42, so that the balance arm can pivot or tilt together with the bracket fixture, on the top of the column. In order to have the airplane assume attitudes of climb and dive, a platform 43, which supports both the airplane and the fan motor and other pertinences, may have a bracket 44 on the under side of the platform pivotally attached to the adjacent end of the arm 40 by means of a pivot pin 45. By this expedient the airplane is able to tilt about an axis which is parallel to the longitudinal axis of the balance arm 40, and spaced only a short distance from the arm.

The fan motor 22, which is electrically driven, has extending therefrom a conventional driveshaft 50, shown in FIGURE 4, an outer end of which is journalled in a bushing 51 secured to a frame 52, the frame in turn being appropriately secured to the platform 43. Also located at one end in the bushing 51, and adjacent the other end in a cage 54 of special design, is a hollow or tubular shaft 53. A driven gear 56 is rotatably mounted on the shaft 53. In this way the gear 55, on the driveshaft 50 meshing with the gear 56 on the shaft 53, serves to carry power from the fan motor 22 to fan blades 57. The fan blades are carried by a hub 58, preferably rotatably mounted upon the shaft 53, as is also the gear 56, as shown in FIGURES 4 and 8.

The cage 54, is attached to extensions 59, which are long enough to provide ample space within which the fan blades can rotate. Although various types of structure may be employed, the cage is here shown as being built up of a nest of tubes 60, open at both ends, and all lying parallel to each other extending over the entire expanse of the cage, so that the flow of air generated by rotation of the fan blades is all directed in a parallel stream as it leaves the cage and flows over the various surfaces of the airplane.

To carry out the purpose of the invention, some means must be provided for transmitting movement of the rudder pedals 18 and control stick 19, to the sundry control services on the model airplane. It is, of course, desirable to have the airplane immediately responsive to manipulation by the operator. To build sensitivity into the system, the model airplane and its mounting including the platform 43, and the fan motor, fan blades and gearing and other appertinences, are preferably counterbalanced on the balance arm 40, so that the slightest motion of the ailerons or elevator controls will shift the position of the airplane in an appropriate direction. Although various types of springs and conventional counterbalancing agents may be found appropriate, for simplicity there is shown a counterweight 65 adjustably mounted upon the right-hand end of the arm 40 as shown in FIGURE 1. Having a set-up of this general description, the position of the weight may be varied with respect to the bracket fixture 41, and related to the arm length on the opposite side of the bracket fixture between the fixture and the platform, so as to approach a balance to the greatest degree possible. Balancing, of course, can further be improved by having the weight 65 greater or lesser as need be, in order to produce a proper balancing effect.

In the interest of simplifying the description, reference is first made to the response of the ailerons to manipulation of the control stick 19. It will be understood that following conventional practices, as the control stick is tilted toward the right or toward the left, it is intended that in response, the airplane, will roll clockwise or counterclockwise corresponding in degree to the extent of movement of the control stick. Further still, it is contemplated that the roll, as described will take place whether the airplane may be climbing, diving, turning or in a horizontal attitude simultating normal flight. Details with respect to the attachment of cables to the control stick have been omitted inasmuch as attachments of this kind are well known. It is sufficient to state that one cable lead, namely the cable lead 23, in response to manipulation of the control stick 19, toward the right or toward the left, will move endwise either outwardly with respect to the pilot station 14, or inwardly. In other words, the cable 23, slides endwise with respect to the composite cable or cable jacket 15. As a consequence, means is provided for transferring the endwise movement to the ailerons 33 and 34, whereby to cause changes in the positions and relative positions of the ailerons to roll the airplane in one direction or the other.

Accordingly, the cable lead 23, is attached to an arm 66, of a bell crank 67, which in turn is pivotally mounted upon a pivot shaft 68, on a column 69, supported in turn upon the platform 43, by means of a bracket 70. A hole 71, is provided in the platform through which the cable leads can freely pass and for as little interference as possible with movement of the cable leads.

Another arm 72, of the bell crank 67, has a cable lead 23' attached at its lowermost end and the cable lead 23' extends from the arm 72 through the tubular driven shaft 53, previously described, and shown advantageously in FIGURES 2, 3, 4, 8, and 10.

Similarly the cable lead 24 is attached to an arm 74 of a bell crank 75 mounted upon a pivot shaft 76 attached to the column 69. A cable lead 24' is attached to the other arm 77 of the bell crank 75. In a similar fashion the cable lead 25 is attached to an arm 78 of the bell crank 79 in turn mounted by means of a pivot shaft 80 to the column 69. Here again, a cable lead 25' attaches to the other arm 81 of the bell crank 79.

The cable leads here under consideration are relatively stiff cable leads so that they can excite movement by either pushing or pulling upon the leads under circumstances where the jacket of the composite cable 15 is held in fixed position as, for example by employment of a bracket 82 attached to the under side of the platform 43. Consequently when any one or another of the cable leads, 23, 24, 25, are moved downwardly, the corresponding bell crank is tilted in a clockwise direction as viewed in FIGURE 7, and tilting in this direction will result in a movement of the corresponding cable lead 23', 24', 25', as the case may be, in a direction from right to left as viewed in FIGURE 7. Conversely, when any one of the cable leads 23, 24, 25 is moved in an upward direction, as viewed in FIGURE 7, the corresponding bell crank is rotated counterclockwise and as a result the respective lead 23', 24', 25' is moved in a direction from left to right, as viewed in FIGURE 7. In this fashion the respective control surfaces are moved in one direction or another as desired.

Continuing with the specific description of manipulation of the ailerons by action of the cable lead 23, 23' the lead 23' should be followed through the tubular shaft 53 to the interior of the fuselage. Within the fuselage, the cable lead 23' is anchored to an inner sleeve 85. Surrounding the inner sleeve is an outer sleeve 86 attached to the inner sleeve 85 by employment of the bearing 87. Hence, the outer sleeve 86 is moved axially from right to left to right in response to corresponding movement of the cable lead 23, but nevertheless remains free to rotate throughout a full 360 degrees with respect to the inner sleeve 85. This is an important function in permitting the model airplane to roll freely in one direction or another and realistically as an airplane should in response to manipulation of the control stick in a direction controlling the ailerons. Any number of 360 degree rolls in the same direction is possible.

Attached to the outer sleeve 86 on one side, namely the lower side as viewed in FIGURES 11, 12 and 14, is an arm 88 at the lower end of which a crank arm 89 is pivotally attached by means of a pivot pin 90. At the opposite end of the crank arm is a crankshaft 91, journalled in a section 92 of the fuselage, the crankshaft being nonrotatably attached to the crank arm, and also nonrotatably attached to the aileron 34, as shown in FIGURE 10.

As a result of the interconnection of parts just described, when the cable lead 23, for example, is moved from right to left, as viewed in FIGURES 3, 10 and 11, the lower end of the arm 88 is also moved from right to left, as viewed in FIGURES 3 and 11 for example, and accordingly the crankshaft 91 is rotated in a clockwise direction as viewed in FIGURE 14, which results in depressing or lowering the aileron 34. Conversely, when the cable lead 23, is moved from left to right, the motion is translated into counterclockwise rotation of the crankshaft 91 which results in rotating and elevating the aileron 34.

Similarly, on the upper side of the outer sleeve 86, there is provided an arm 93 to the upper end of which is attached the crank arm 94, by means of a pivot pin 95. A crankshaft 96 on the opposite end of the crank arm 94, is nonrotatably attached to the aileron 33.

It will be noted, therefore, that since both ailerons are attached to the crank arms and respective arms to the outer sleeve 86, both ailerons will be moved by the same sleeve, but in respectively opposite directions. That is to say the sleeve is moving in a direction from right to left as viewed in FIGURES 2 and 10, and the aileron 34 in response thereto is being depressed. On the contrary the aileron 33 will be elevated because of rotation of the crank arm in a counterclockwise direction. Conversely, when this cable lead 23 is being moved from right to left resulting in the aileron 34 being raised or elevated, the aileron 33, on the contrary, will be lowered or depressed, as a result of the same longitudinal or axial movement of the outer sleeve 86.

To manipulate the elevator, the cable lead 24' is attached to a tubular sleeve 100 which extends through the longitudinal axis of the fuselage and in fact, is rotatably contained within the outer sleeve 86 by means of a bearing 101, opposite races of which are attached respectively to the outer sleeve 86 and the exterior of the tubular sleeve 100. Actually the sleeve 100 remains stationary in operation and the airplane and attached bearing races rotate about it.

At the innermost end of the tubular sleeve 100, is a bearing 102, having an inner race 103 attached to the sleeve and an outer race 103' which is attached to an elevator connecting arm 105. The connecting arm 105, attaches to a crank 106, pivotally supported on the fuselage by means of a pivot pin 107. The crank in turn is attached to the elevator 35. In view of the attachment as herein described, when the cable lead 24' is shifted for example, in a direction from right to left, viewed in FIGURES 2, 10 and 11, the crank 106 will be rotated in a clockwise direction and this will depress the elevator 35 causing the airplane to dive. Contrarily, when the cable lead 24' is moved from left to right, as viewed in the same FIGURES 2, 10 and 11, the crank 106, will be rotated in a counterclockwise direction causing the elevator to tilt upwardly, which in turn will cause the airplane to climb.

In order to manipulate the rudder 36, a cutout 110, is provided in the tubular sleeve 100. The cable 25' passes through the cutout into the interior of the tubular sleeve 100 and extends entirely through the tubular sleeve outwardly of the innermost end of the tubular sleeve. The innermost end of the cable lead 25' is secured to the inner race 111 of a bearing 112. The outer race 113 of the bearing has attached thereto a rudder connecting arm 114, which in turn is attached to the crank 115. The rudder 36 is pivotally secured to the fuselage by means of a pivot pin 116. The crank 115 in turn is mounted upon the rudder 36. Accordingly, as the cable lead 25 is moved, for example, from right to left, as viewed in FIGURES 2, 10 and 11, the crank 115 is rotated in a counterclockwise direction, as viewed in FIGURE 10. This will cause the rudder to move toward the left side of the airplane and will result in causing the airplane to steer toward the left. Contrarily, when the cable lead 25 is moved in a direction from left to right, the movement will result in rotating the crank 115 in a counterclockwise direction as viewed in FIGURE 10, causing the rudder to move towards the right side of the airplane resulting in turning the airplane towards the right. To permit the airplane to turn the platform 43 is mounted upon a pivot so that the plaform and its accessories and the airplane all turn at the same time. Turning may be provided for by employment of a bracket like the bracket 44 separated into an upper section 44' and a lower section 44" interconnected by means of a vertical pivot shaft 98 as shown in FIGURE 2.

As has been previously noted, the cable leads 25' and 25 are attached to the rudder system exemplified by the rudder pedals 18, and consequently the airplane can be caused to simulate right hand or left hand turning, as the case may be, in response to manipulation of the rudder pedals in the conventional directions expressed in actual pilot control systems.

What is, of course, important in the cable interconnecting system, is the presence of the bearings 87, 102 and 112. Because of the presence of these bearings, all of the central system of the control mechanisms exemplified in part by the inner sleeve 85, and its cable lead 23', the tubular sleeve 100 and its cable lead 24', and the centrally disposed cable lead 25' and its attached inner race 111, can remain fixed at all times with respect to the bell cranks and platform exterior of the airplane while the airplane itself can freely rotate as it would during a right or left roll. Reference is made not only to the relative rotatable relationship of the outer sleeve 86 which carries control motion to the ailerons, but also to the relative rotatability of the elevator connecting arm 105 to the tubular sleeve 100 and the relative rotatability of the rudder connecting arm to the inner race 111. It will be observed that all of the outer races are connected to control surfaces of one kind or another axially on the model airplane and all of these can rotate freely and unobstructedly in response to roll of the airplane, without interfering in any manner with their response to control from the pilot station. As a result of this, even though the airplane is in a roll in one direction or another, it can at the same time, be made to climb or dive. Similarly, also while in a climb or dive, the airplane can be turned by manipulation on the rudder and rolled as desired. All three motions are entirely independent of each other, so far as the freedom of motion of the controls is concerned, and can be worked simultaneously or separately in virtually any combination.

During all of this motion, the propeller rotates realistically to give the illusion of propulsion, but it will be understood that the propeller merely idles and is driven rotatively by the flow of air which is primarily for its effect upon the control surfaces of the airplane. To accomplish this, the propeller 32 is mounted upon a hub 120, and a bearing 121 within the hub 120, which rotatively mounts the propeller upon a mounting sleeve 122 in turn anchored to the nose section 31 of the airplane fuselage. Since the mounting sleeve is, in effect, part of the airplane, it must be free to rotate as the airplane rotates when controlled in various manners as herein above described. To accomplish this, the forwardmost end of the mounting sleeve is attached to a bearing 123, the outer race of which is contained within a collar 124. Preferably, the collar is also freely rotatable in order to minimize friction, and is interconnected through a bearing 125 to a spacer 126. The spacer in turn is anchored, for example, by means of a set screw 127 to the tubular drive shaft 53. By virtue of the bearings 123 and 125, just described, it will be clear that there is as little resistance to rotation as is practically possible when the airplane rotates as provided for about its longitudinal axis in response to manipulation of the controls.

From the foregoing description it will be understood that the model airplane device, although not in every respect simulative of an airplane in actual flight, nevertheless has the general attributes of flight control of a model airplane, at least sufficiently so to perform realistically in response to controls. Because the airplane flies in response to a draft of air generated on the platform which carries the airplane, the draft can be confined to an area generally occupied by the airplane wings, rudder and elevator, and hence an airflow such as would be created by a wind tunnel is not necessary to the performance. The airplane can climb and dive in response to manipulation of its elevator, and as it does so, the balance arm 40 will tilt up and down depending on whether the airplane is climbing or diving. Also, as made reference to in several portions of the description, the airplane can roll irrespective of the position of tilt of the balance arm. Because the airplane does not fly free, but rather is permanently attached to the appropriate end of the balance arm as a consequence it cannot travel freely in response to rudder control. Nevertheless when the rudder is rotated to simulate a turn of the airplane toward the right or left, as the case may be, the platform arm will rotate a limited amount. The direction will be slightly clockwise, as viewed from above, when the airplane is controlled to turn toward the right and slightly counterclockwise, as viewed from above, as the airplane is controlled to turn toward the left, thereby giving the illusion of a right-hand or left-hand turn.

Further still, because the pilot station can be located immediately astern of the airplane, and the airplane can be suspended in full view of the "pilot," all motions of the model airplane can be viewed as the airplane responds immediately to the controls, thereby to give a realistic affect to manipulation on the part of the operator.

While the invention has herein been shown and described in what is conceived to be the most practical and preferred embodiment, it is recognized that departures may be made therefrom within the scope of the invention which is not to be limited to the details disclosed herein but is to be accorded the full scope of the claims so as to embrace any and all equivalent devices.

Having described the invention, what is claimed as new in support of Letters Patent is:

1. A model airplane flight control system comprising an airplane, a supporting structure on a stationary support, said structure comprising a stationary member, a transverse arm pivotally mounted on the stationary member on a longitudinal axis, a platform system comprising a platform, a freely moving connection between said platform and the transverse arm and another freely moving connection between said airplane and said platform whereby said airplane can assume attitudes of roll, climb, dive, and turn, an air flow generating fan on said platform, and controls for said airplane extending from said platform to the airplane.

2. A model airplane flight control system comprising an airplane, a supporting structure on a stationary support, said structure comprising a stationary member, a transverse arm pivotally mounted on the stationary member on a horizontal axis, a platform system comprising one portion movably connecting said platform system to the transverse arm and another portion movably connecting said airplane to said platform system whereby said airplane can assume attitudes of roll, climb, dive and turn, a fan motor on said platform system having a drive shaft substantially parallel to and laterally offset relative to the longitudinal axis of the airplane, a fan including blades and having a drive shaft rotatably mounted on said platform in longitudinal alignment with the airplane, a drive train from the first identified drive shaft to the second identified drive shaft, and a control for said airplane extending from said platform system to the airplane.

3. A model airplane flight control system comprising an airplane, a supporting structure on a stationary support, said structure comprising a stationary member, a transverse arm pivotally mounted on the stationary member on a horizontal axis, a platform having an attachment system comprising one portion movably connecting said platform to said arm and another portion movably connecting said airplane to said platform whereby said airplane can assume attitudes of roll, climb, dive and turn, a fan motor on said platform having a drive shaft substantially parallel to and laterally offset relative to the longitudinal axis of the airplane, a fan including a tubular drive bushing rotatably mounted on said arm in concentric relationship with said longitudinal axis and fan blades on said bushing, a drive train from said drive shaft to said bushing, and controls for said airplane extending from said arm through said bushing to the airplane.

4. A model airplane flight control system comprising an airplane, a supporting structure adapted to be mounted on a stationary support, said structure comprising an upright stationary member, a transverse arm pivotally mounted on the stationary member on a horizontal axis, and a counter balance on said arm, a platform having an attachment means movably connecting said platform to said stationary support, said attachment means comprising parts tiltably mounted respectively on a vertical axis and on a horizontal axis, and means rotatable about an axis substantially parallel to the longitudinal axis of said airplane connecting said airplane to said platform, a power actuated drive shaft substantially parallel to and longitudinally offset relative to said longitudinal axis of the airplane, a fan including a tubular drive bushing rotatably mounted on said platform in concentric relationship with said longitudinal axis and fan blades on said bushing, a drive train from said drive shaft to said bushing, air directing means comprising a plurality of individual passages in communication between space adjacent the blades and space forward of and over control surfaces of the airplane, said passages being substantially parallel to each other and to the longitudinal axis of the airplane, and controls for said airplane extending from said arm through said bushing to the airplane.

5. A model airplane flight control system comprising an airplane, a stationary support structure on a stationary support, said structure comprising a stationary member, a transverse arm pivotally mounted on the stationary member on a longitudinal axis, a platform system comprising upper and lower platform members, a freely moving substantially vertical pivot connection between said platform members, a freely moving substantially horizontal pivot connection between said platform system and the transverse arm and a freely moving pivot connection extending longitudinally relative to the airplane and connected between said airplane and said platform system, whereby said airplane can assume attitudes of roll, climb, dive and turn, an airflow generating fan on said platform system and controls for said airplane extending from said platform system to the airplane.

References Cited by the Examiner

UNITED STATES PATENTS

| | | | |
|---|---|---|---|
| 1,947,982 | 2/34 | Gerhardt et al. | 46—76 X |
| 2,074,765 | 3/37 | Adams | 244—86 |
| 2,526,371 | 10/50 | Laughead et al. | 35—12 |
| 2,585,468 | 2/52 | Isacco | 244—88 X |

RICHARD C. PINKHAM, *Primary Examiner.*